May 30, 1939.  H. DOERFLER  2,160,131
WAVE MOTION MACHINE
Filed Oct. 23, 1936   3 Sheets-Sheet 2
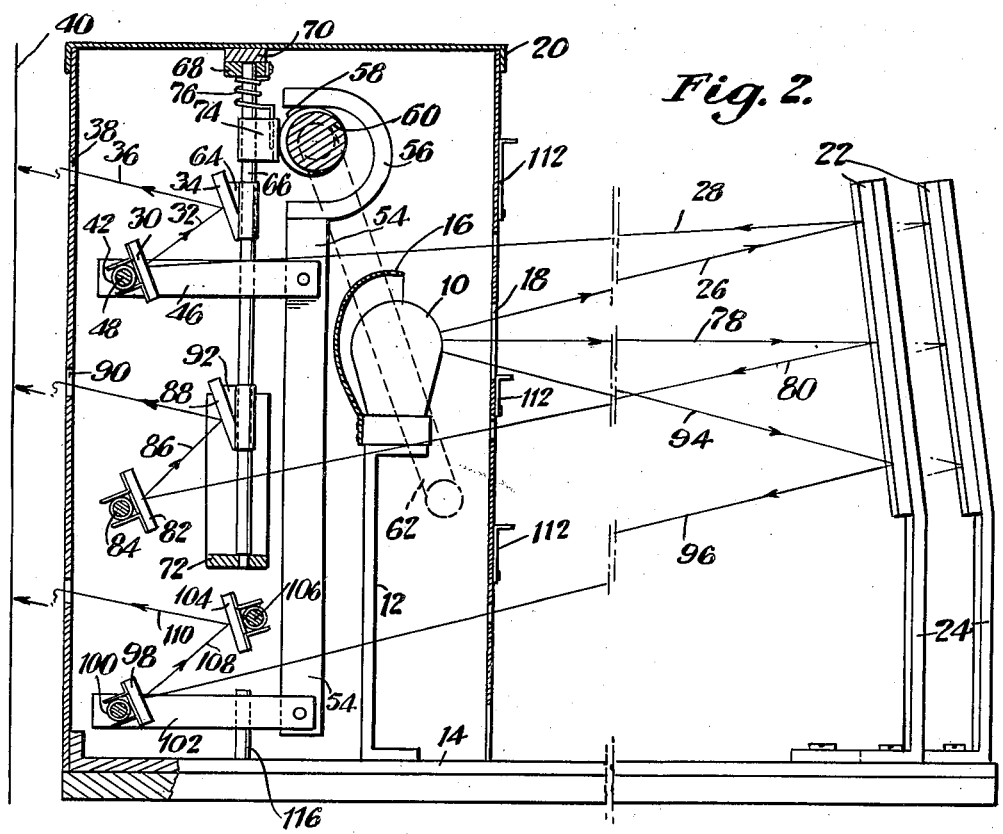
Fig. 2.
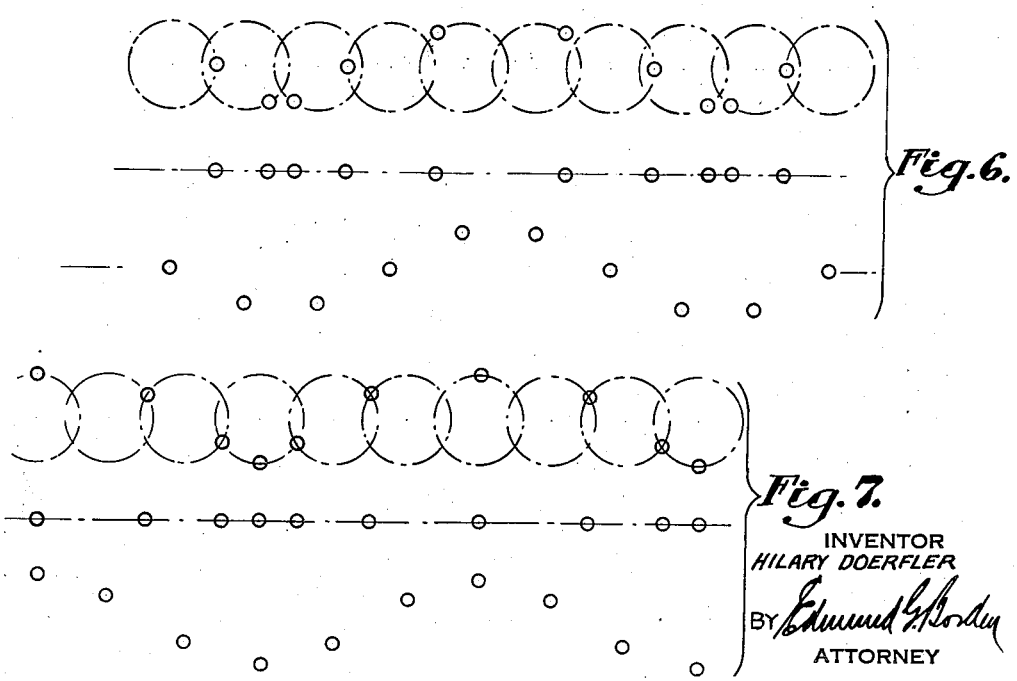
Fig. 6.
Fig. 7.
INVENTOR
HILARY DOERFLER
BY Edmund G. Borden
ATTORNEY May 30, 1939.   H. DOERFLER   2,160,131
WAVE MOTION MACHINE
Filed Oct. 23, 1936   3 Sheets-Sheet 3

INVENTOR
HILARY DOERFLER
ATTORNEY

Patented May 30, 1939

2,160,131

UNITED STATES PATENT OFFICE 2,160,131

WAVE MOTION MACHINE

Hilary Doerfler, Shawnee, Okla.

Application October 23, 1936, Serial No. 107,219

12 Claims. (Cl. 35—19)

This invention relates to an apparatus or machine for reproducing and illustrating different kinds of wave motions.

In accordance with different physical phenomena we have, for example, sine waves such as produced by the water waves, longitudinal waves such as sound waves and transverse waves such as heat waves, light waves and electromagnetic waves.

The illustration of different kinds of wave motions is a very valuable aid for the purposes of teaching wave motion principles in physics. Accordingly an object of the invention is to provide an apparatus by which wave motions of different kinds may be visually illustrated.

Another object of the invention is to provide a wave motion illustrating apparatus by which different types of wave motions may be illustrated separately or simultaneously.

A further object of the invention is to provide a wave motion illustrating apparatus by which a large number of points in a complete wave motion may be illustrated simultaneously and in sequence to trace out quite accurately a wave motion.

With these and other objects in view the invention consists in the wave motion illustrating machine hereinafter described and claimed in the appended claims.

The various features of the invention are illustrated in the accompanying drawings in which:

Fig. 2 is a view in side elevation, with parts shown in section, of the wave machine;

Figs. 6 and 7 are diagrammatic views illustrating the visual manner in which the points in a wave motion are illustrated by the wave machine.

The wave motion is produced with the apparatus of the present invention by the movement of spots of light which are cast upon a screen by a series of mirrors. The mirrors are moved relatively to one another in such a manner that accurate illustrations of different kinds of wave motions are made. Mechanism is provided by which three different types of wave motions may be illustrated.

Figures 3, 4, 5:
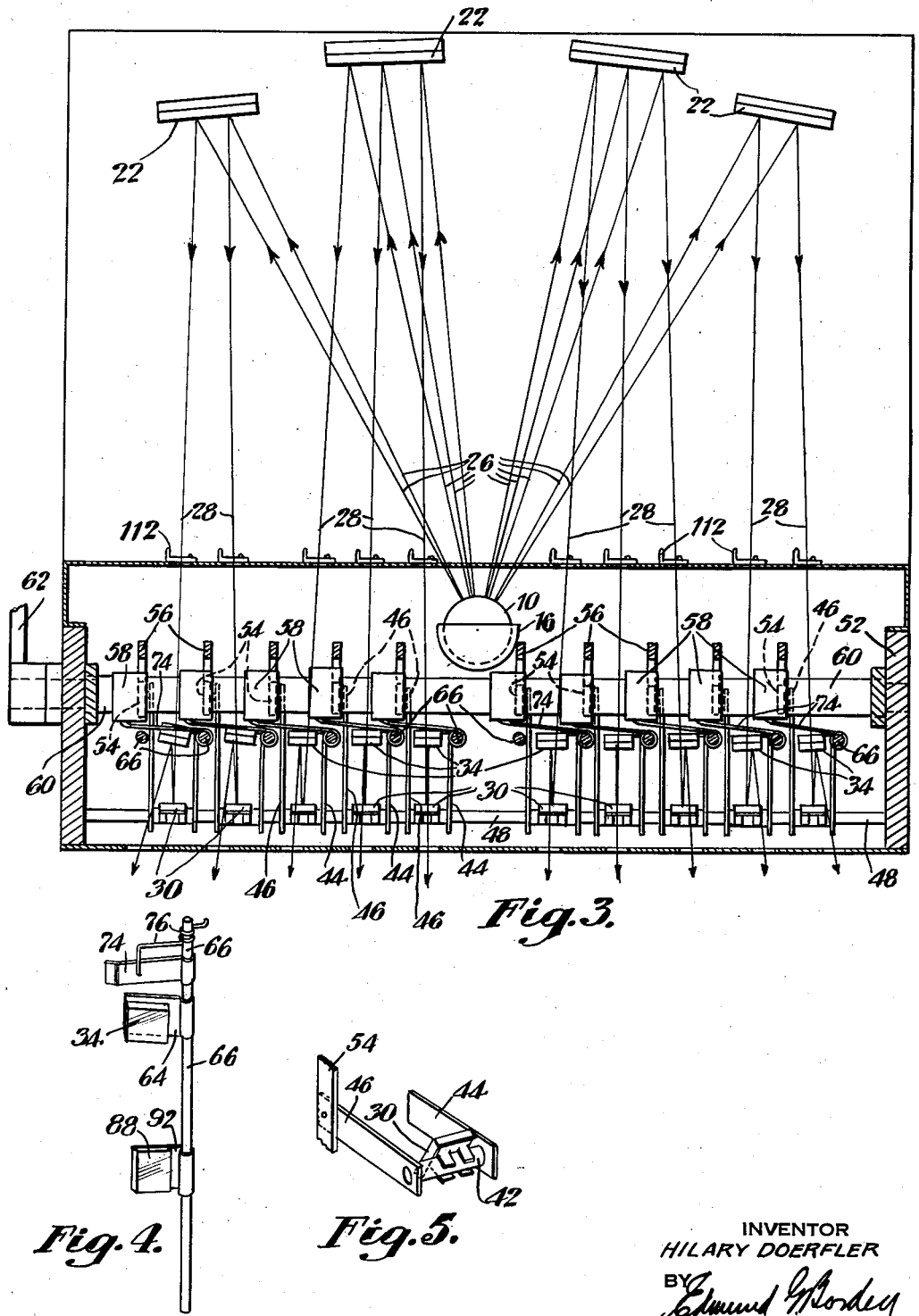
Fig. 3 is a plan view with parts in section of the wave machine.
Fig. 4 is a perspective view of one of the mirror-supporting shafts which is used in the wave machine for rotation about a vertical axis.
Fig. 5 is a perspective view of one of the mirror-supporting arms which are mounted in the wave machine for rotation on a horizontal axis.

The light for projecting the spots upon the screen is derived from an electric lamp 10, Figures 2 and 3, which is mounted upon a stand 12 secured to the base 14 of the machine. A shield 16 is placed behind the light by which the light from the lamp 10 is prevented from striking the screen 40 directly. The light from the lamp 10 is projected rearwardly through an opening 18 in a casing 20 which surrounds the wave projecting mirror mechanism. The beams of light from the lamp 10 are reflected by a series of four mirrors 22 which are supported upon brackets 24 that are secured to the base 14. A circular wave motion such as the motion of water waves is illustrated by means of a mirror mechanism that is mounted in the upper portion of the apparatus. For example light waves which pass from the lamp 10 in beams illustrated by the line with arrows 26, pass to the mirrors 22 and are then reflected in a cone along a path illustrated by a line 28. This cone of light beams strikes a mirror 30 from which the beams are reflected along a line 32 to a mirror 34. From the mirror 34 the light beams pass along the path of a line 36 through an opening 38 in the front of the casing and are projected onto a screen 40 in front of the wave motion machine in the form of spots. The cone or beams of light striking the mirrors are moved by movement of the mirrors 30 and 34 in order to impart a motion to the spot projected onto the screen 40. The mirror 30 is fixed upon a sleeve 42 which is secured between two arms 44 and 46 which constitute a rocking lever. This compound lever is illustrated in detail in Fig. 5. The sleeve 42 is mounted for rotation upon a horizontal shaft 48 which in turn extends between an upright support 50 and support 52 at each end of a supporting frame. The arm 46 of the compound lever is pivoted to a cam lever 54, Fig. 2, the upper end of the lever 54 being provided with a yoke 56 which rests upon a cam 58 rotatably mounted upon a shaft 60 which has its opposite ends journaled in the frame uprights 50 and 52. The outer end of the shaft 60 extends beyond the frame member 52 and a hand lever 62 is fixed upon such lever by which rotation of the shaft may be secured. When the shaft is rotated the cam lever 54 is moved with a reciprocating up and down motion, this motion in turn imparting a rocking motion to the sleeve 42 upon which the mirror 30 is fixed. The motion therefore of the shaft 60 by the hand lever will provide an oscillating movement of the mirror 30 about a horizontal axis.

Figure 1:
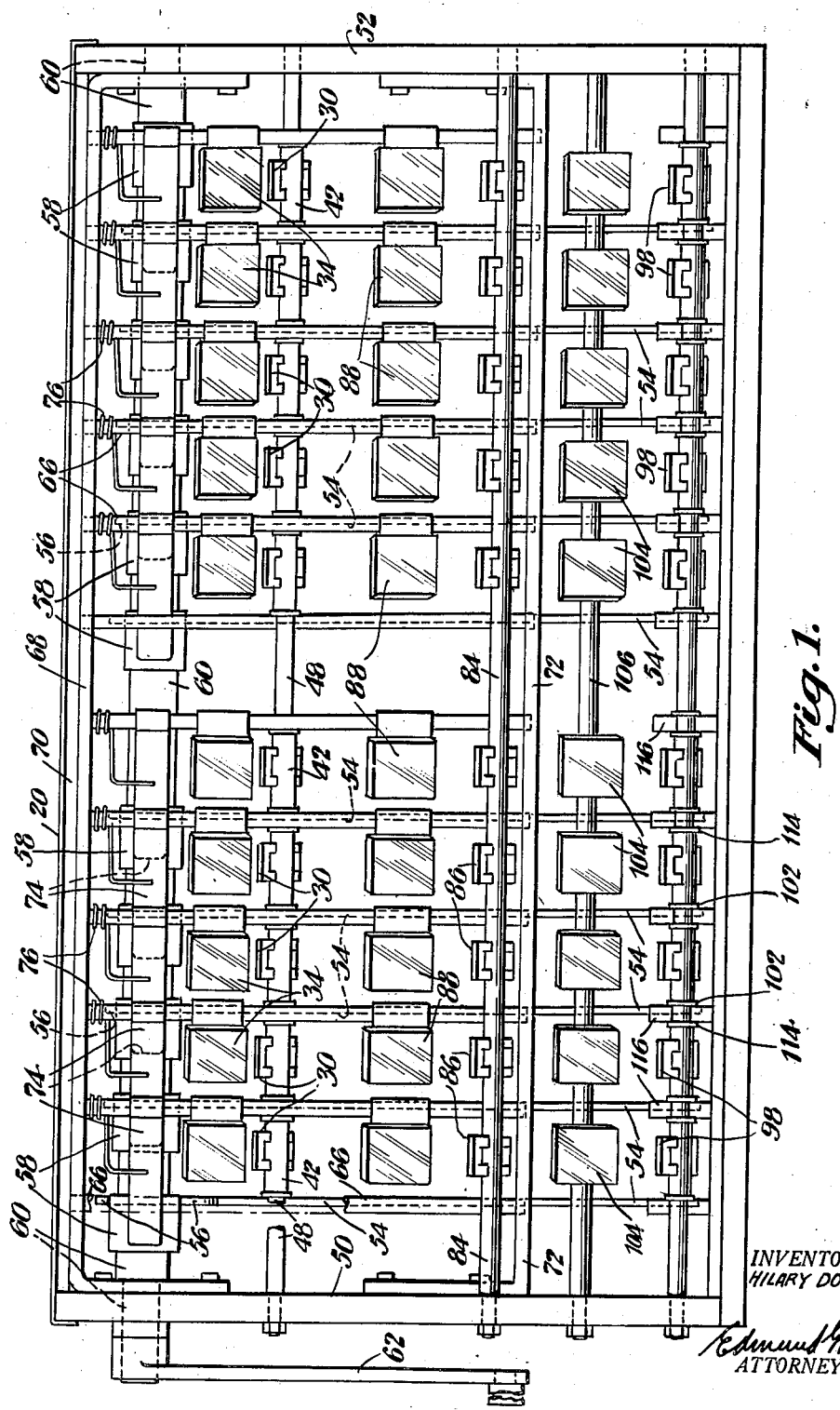
Fig. 1 is a view in front elevation, with parts removed, of a wave illustrating machine embodying a preferred form of the invention.

The mirror 34 is mounted upon a bracket 64 which is securely fixed to a vertically mounted shaft 66, Figs. 2 and 4. The shaft 66 is rotatably mounted at its upper end in a bearing 68 secured to a cross arm 70 forming part of the frame. The lower end of the shaft is rotatably mounted in a cross arm 72 which is fixed in position at its opposite ends to the frame members 50 and 52, see Fig. 1. On the upper end of the shaft is fixed a rocker arm 74, Figs. 2 and 4, which projects outwardly from the shaft and is held in contact with the face of the cam 58 on the shaft 60 by means of a coiled spring 76 which is secured between the bearing 68 and the cross arm 74. Therefore as the cam 58 rotates the rocker arm will impart an oscillating movement of the shaft 66 about a vertical axis and impart in turn an oscillating movement to the mirror 34 about a vertical axis. The resultant motion imparted to the beams of light reflected from the mirrors 30 and 34 as one is moved about a horizontal axis while the other is moved about a vertical axis will give a substantially circular motion to a spot of light reflected from the mirrors provided the amplitude of oscillation of the mirrors is substantially equal. The circular path of the spot of light from the mirrors 34 is illustrated in the upper figure of Figs. 6 and 7. Thus, while a complete rotation of the shaft 60 is used to impart motions to the mirrors 30 and 34, a spot of light from the mirrors will trace the circular path illustrated in Figs. 6 and 7.

Longitudinal waves such as sound waves are illustrated by spots of light reflected from two fixed and one movable mirrors. In the present apparatus this illustration is accomplished as follows:

A cone of light from lamp 10 traveling along a line 78 is reflected from a mirror 22 along a path illustrated by a line 80. The cone of light passing along the line 80 strikes a mirror 82 which is fixedly mounted on a rod 84 which is mounted at its opposite ends in the uprights 50 and 52 of the frame, see Fig. 1. The beam of light striking the mirror 82 is reflected to pass along a line 86 to strike a mirror 88. From the mirror 88 the beam of light passes through an opening 90 in the front of the casing to be projected upon the screen 40. The mirror 88 is attached to a bracket 92 which in turn is secured to and fixed for rotation with the vertical shaft 66, see Figs. 2 and 4. With this set of mirrors a beam of light passing from the lamp 10 will be reflected from the mirror 22 to the fixed mirror 82 and then the beams or cone of light striking the mirror 88 will be given an oscillating motion by the movement of the mirror 88 on the vertical shaft 66. The movement of the spots of light by this mirror mechanism will impart a motion which is illustrated by the central figures of Figs. 6 and 7.

To illustrate transverse waves, such as heat waves, light waves and the like two stationary and one movable mirror are used, the movable mirror being oscillated about a horizontal axis. To accomplish this a beam of light passing from the lamp 10 will move along a line 94 to a mirror 22 and will be reflected along a line 96 to a movably mounted mirror 98. The mirror 98 is fixed upon a sleeve 100 which is secured to a compound lever mechanism having a guide arm and a rocker arm 102 similar to that illustrated in Fig. 5. The rocker arm 102 of the lever is pivotally connected to the lower end of the cam lever 54, Fig. 2. The light beam striking mirror 98 is reflected to a mirror 104 which is fixed on a horizontal rod 106 that is secured between the uprights 50 and 52 of the machine frame, Fig. 1. The beam of light passes from the mirror 98 to the mirror 104 along a line 108 and is then reflected along a line 110 to the screen 40 to give a reflected spot of light. The oscillation of the mirror 98 around a horizontal axis will impart an up and down motion to the spot of light on the screen 40 and the motion of this light spot is illustrated by the lower figures of Figs. 6 and 7.

The spots of light for illustrating different wave motions as described above are simply single spots of light that are produced by a cone of light projected from a single mirror. In order that the total movement of the wave motion may be illustrated the apparatus is arranged so that ten different spots of light illustrating ten different points in the wave are used to illustrate the total wave. The ten different spots of light are arranged in consecutive series to illustrate different positions or portions of the wave motion and these spots of light then moving in their own paths cooperate with the other spots of light in illustrating simultaneously the entire wave motion. To accomplish this the mirrors for illustrating the different wave motions are arranged in the machine or apparatus in different horizontal planes. The mirrors 30 and 34 for illustrating circular motion are in the upper horizontal plane. The mirrors 82 and 88 for illustrating the longitudinal wave motion are in the central horizontal plane and the mirrors 98 and 104 are located in the lower horizontal plane. Four mirrors 22 are used in the rear of the machine for reflecting rays of light to each one of the various mirrors in the horizontal planes. All of the ten sets of mirror mechanism have the same construction. The cam levers 54 are the same. The cam 58 for each is the same, these cams being fixed upon the shaft 60 and moving simultaneously to impart simultaneously the same type and amplitude of movement to each of the levers for operating the mirrors. The only distinction between each individual set of mirrors in the ten sets is that the angle of mounting of the movable mirrors on their supports is different for each in order to arrange the mirrors for projecting the spots in sequence upon a screen so as to simultaneously trace out the entire wave length, it being understood that during the complete rotation of the shaft 60 the entire wave length motion will move throughout its cycle of motion.

The beams of light passing from the mirrors 22 to each of the different sets of horizontal mirrors pass through openings in the rear of the casing 20. If all of the openings in the rear of the casing 20 are open then all three wave motions will be simultaneously illustrated upon the screen. Shutters 112 are rotatably mounted upon the front face of the casing in such a position that they may swing down to close the openings through which the light from the mirrors 22 is reflected. By means of the shutters 112 any set of openings desired may be opened or closed and thus allow one or any combination of the waves to be projected upon the screen at the same time.

As shown in Fig. 5 the compound rocker arms 46 and 102 have two arms, one of them being connected to the cam levers 54 and the other arm, a shorter arm is used for holding the compound levers in fixed position. The shorter arms 44 project rearwardly so as to bear against the vertical shafts 66. The shorter arm 114 on the compound lever 102 bears against pins 116 mounted in the base of the frame.

By the above described apparatus three different types of wave motions have been illustrated. It may be understood, however, that different types of wave motions may be illustrated by this type of apparatus by imparting different relative movements to the reflecting mirrors in order to give different forms of movement to the spots which are projected upon a screen.

It is to be understood that the screen 40 is usually positioned a considerable distance from the wave machine and the machine is positioned between the observer and the screen. The size and form of the light spots will depend upon the size and form of the mirrors 30, 82 and 98 and size and form of the lamp filament.

The preferred form of the invention having been thus described what is claimed as new is:

1. In a wave motion machine the combination of a source of light, a plurality of mirrors mounted in separated rows, the rows being spaced apart and the mirrors of one row being arranged angularly with reference to the mirrors in the next adjacent row so that bands of light will pass by reflection from the light source to the mirrors of each row in succession, one row of mirrors being movably mounted, means to move the movable mirrors in a regular cycle to cause the light bands reflected thereby to move, said mirrors having surfaces of sufficient area to receive and the angular mounting of said mirrors being arranged to reflect the light bands in all positions of their movement to produce and reflect spots of light in a row on a screen positioned in front of the machine.

2. In a wave motion machine, the combination of a source of light, a plurality of mirrors mounted in separated rows, the rows being spaced apart and the mirrors of one row being arranged angularly with reference to the mirrors in the next succeeding row so that bands of light will pass by reflection from the light source to the mirrors of each row in succession, the mirrors of one row being mounted to move about horizontal axes, means to move the movable mirrors about their axes in a regular cycle to cause said light bands to move, said mirrors having surfaces of sufficient area to receive and the angular mounting of said mirrors being arranged to reflect the light bands in all positions of its movement to produce and reflect spots of light in a row on a screen positioned in front of the machine.

3. In a wave motion machine, the combination of a source of light, a plurality of mirrors mounted in separated rows, the rows being spaced apart and the mirrors of one row being arranged angularly with reference to the mirrors in the next succeeding row so that bands of light will pass by reflection from the light source to the mirrors of each row in succession, the mirrors of one row being mounted to move about vertical axes, means to move the movable mirrors about their axes in a regular cycle to cause said light bands to move, said mirrors having surfaces of sufficient area to receive and the angular mounting of said mirrors being arranged to reflect spots of light in a row on a screen positioned in front of the machine.

4. In a wave machine, the combination of a source of light, a plurality of mirrors mounted in separated rows, the rows being spaced apart and the mirrors of one row being arranged angularly with reference to the mirrors in the next succeeding row so that bands of light will pass by reflection from the light source to the mirrors of each rod in succession, the mirrors of one row being mounted to move about a vertical axis, the mirrors of another row being mounted to move about a horizontal axis, means to move the movable mirrors about their axes in a regular cycle to cause light bands thereon to move, said mirrors having surfaces of sufficient area to receive and the angular mounting of said mirrors being arranged to reflect the light bands in all positions of their movement to produce and reflect spots of light in a row on a screen positioned in front of the machine.

5. In a wave motion machine, the combination of a source of light, a plurality of mirrors mounted in separated rows, the rows being spaced apart and the mirrors of one row being arranged angularly with reference to the mirrors in the next succeeding row so that bands of light will pass by reflection from the light source to the mirrors in each row in succession, the mirrors of one row being rotatable about a substantially horizontal axis, the mirrors of another row being rotatable about a substantially vertical axis, the mirrors of a third row being fixed against movement, means to rotate the movable mirrors about their respective axes in a regular cycle to cause the light bands to move thereon, said movable mirrors having surfaces of sufficient area and the angular mounting being arranged to receive and reflect the light bands in all positions of their angular movement to reflect and move a row of spots of light upon a screen in front of the machine to illustrate wave motion.

6. In a wave machine the combination of a source of light, a plurality of mirrors mounted in separated rows, the rows being spaced apart and the mirrors of one row being arranged angularly with reference to the mirrors in the next succeeding row so that bands of light will pass by reflection from the light source to the mirrors of each row in succession, the mirrors of one row being fixed, the mirrors of another row being rotatably mounted, means to rotate the movable mirrors simultaneously about their respective axes in a regular cycle to cause light bands to move thereon, the movable mirrors having surfaces of sufficient area and their angular mounting being arranged to receive and reflect the light bands in all positions of their angular movement, the angular mounting of one movable mirror on its axis with reference to the angular mounting of the next succeeding mirror on its axis in the row being so arranged that the rotary movement of the mirrors in a complete cycle will produce and move a row of spots of light on a screen in front of the machine to illustrate a complete wave motion.

7. In a wave motion machine, the combination of a source of light, a plurality of sets of separately mounted mirrors, each set comprising a series of mirrors mounted in rows, the rows being spaced apart and the mirrors of each row being arranged angularly with reference to the mirrors in the next succeeding row, so that bands of light will pass by reflection from the source to the mirrors of each row in succession, the mirrors of one row of each set being movably mounted, means to simultaneously move the movable mirrors of each set in a regular cycle to cause light bands to move thereon, said movable mirrors of each set having surfaces of sufficient area and the angular mounting of said mirrors being arranged to reflect the light bands in all positions of their relative angular movement to produce and reflect spots of light in rows upon a screen positioned in front of the machine.

8. In a wave motion machine, the combination of a source of light, a plurality of sets of separately mounted mirrors, each set comprising a series of mirrors mounted in rows, the rows being spaced apart and the mirrors of one row being arranged angularly with reference to the mirrors in the next succeeding row, so that bands of light will pass by reflection from the source to the mirrors of each row in succession, the mirrors of one row of two of said sets being mounted to move about a substantially horizontal axis, the mirrors of another row of each set being rotatably mounted, means to simultaneously move the movable mirrors of each set about their axes in a regular cycle to cause said light bands to move, said movable mirrors of each set having surfaces of sufficient area and the angular mounting of said mirrors being arranged to reflect the light bands in all positions of their relative angular movement to produce and reflect rows of spots of light on a screen positioned in front of the machine.

9. In a wave motion machine, the combination of a source of light, a plurality of sets of separately mounted mirrors, each set comprising mirrors mounted in rows, the rows being spaced apart and the mirrors of one row being arranged angularly with reference to the mirrors in the next succeeding row so that bands of light will pass by reflection from the source to the mirrors of each row in succession, the mirrors of one row of two of said sets being mounted to move about substantially vertical axes, the mirrors of another row of each set being rotatably mounted about axes angularly arranged with reference to the axes of the first mentioned movable mirrors, means to simultaneously move the movable mirrors of each set in a regular cycle to cause said light bands to move, said movable mirrors of each set having surfaces of sufficient area and the angular mounting of the mirrors being arranged to reflect the light bands in all positions of their relative angular movement to produce and reflect rows of spots of light on a screen positioned in front of the machine.

10. In a wave motion machine, the combination of a source of light, a plurality of sets of separately mounted mirrors, each set comprising a series of mirrors mounted in rows, the rows being spaced apart and the mirrors of one row being arranged angularly with reference to the mirrors in the next succeeding row so that bands of light will pass by reflection from the source to the mirrors of each row in succession, the mirrors of one row of two of said sets being mounted to move about substantially vertical axes, the mirrors of one row of two of said sets being mounted to move about substantially horizontal axes, means to move the movable mirrors of each set in a regular cycle to cause said light bands to move, said movable mirrors of each set having surfaces of sufficient area and the angular mounting of the mirrors being arranged to reflect the light bands in all positions of their regular angular movement to produce and reflect rows of spots of light on a screen positioned in front of the machine.

11. In a wave motion machine, the combination of a source of light, a plurality of sets of mirrors, each set comprising a series of mirrors mounted in separated rows, the rows being spaced apart and the mirrors of one row being arranged angularly with reference to the mirrors in the next succeeding row so that bands of light will be reflected from the light source to the mirrors in each row in succession, the mirrors of one row of each set being rotatably mounted, the mirrors in another row of each set being rotatably mounted about axes arranged at an angle to the axes of mounting of the first mentioned rotatable row of mirrors, means for rotating the movable mirrors in a regular cycle to move the bands of light reflected by the mirrors, said movable mirrors having surfaces of sufficient area to receive and the angular mounting of the mirrors being arranged to reflect the light bands in all positions of the movable mirrors, the sets of mirrors being spaced apart vertically in the machine and the movable mirrors of each set being fixed at consecutive angular positions on their axes in their moving cycles to produce and move rows of spots of light on a screen positioned in front of the machine to illustrate complete wave motions.

12. In a wave motion machine, the combination of a source of light, a plurality of sets of mirrors, each set comprising a series of mirrors mounted in rows, the rows being spaced apart and the mirrors of one row being angularly arranged with reference to the mirrors in the next succeeding row so that bands of light will be reflected from a light source to the mirrors in each row in succession, the mirrors of one row of each set being fixed, the mirrors of another row of each set being rotatably mounted, the mirrors in another row of each set being rotatably mounted about axes arranged at an angle to the axes of the first mentioned rotatably mounted mirrors, means for simultaneously rotating all of the movable mirrors in a regular cycle to move the bands of light reflected by the mirrors, said movable mirrors having surfaces of sufficient area to receive and the angular mounting of said mirrors being arranged to reflect the light bands in all positions of the movable mirrors, the sets of mirrors being arranged at different levels in the machine, the movable mirrors of each set being fixed at consecutive angular positions on their axes in their moving cycle to produce and move rows of spots of light on a screen positioned in front of the machine to illustrate different complete wave motions and means mounted adjacent the paths of bands of reflected light of each set by which any row of spots of light may be cast upon or cut off from the screen.

HILARY DOERFLER.